United States Patent
Gish (10) Patent No.: US 12,182,070 B2
(45) Date of Patent: Dec. 31, 2024

(54) FRACTAL GEOMETRY OR BIO-INSPIRED SYSTEM FOR COMPLEX FILE ORGANIZATION AND STORAGE

(71) Applicant: Peter Antony Gish, Hanover, NH (US)

(72) Inventor: Peter Antony Gish, Hanover, NH (US)

(73) Assignee: Peter Gish, Hanover, MA (US)

( * ) Notice: Subject to any disclaimer, the term of this patent is extended or adjusted under 35 U.S.C. 154(b) by 0 days.

(21) Appl. No.: 18/095,831

(22) Filed: Jan. 11, 2023

(65) Prior Publication Data

US 2023/0222098 A1 Jul. 13, 2023

Related U.S. Application Data

(60) Provisional application No. 63/298,401, filed on Jan. 11, 2022.

(51) Int. Cl.
*G06F 16/16* (2019.01)
*G06F 40/279* (2020.01)

(52) U.S. Cl.
CPC .......... *G06F 16/166* (2019.01); *G06F 40/279* (2020.01)

(58) Field of Classification Search
CPC ....... G06F 16/166; G06F 40/279; G06F 16/93
See application file for complete search history.

(56) References Cited

U.S. PATENT DOCUMENTS

| | | | |
|---|---|---|---|
| 5,430,812 A * | 7/1995 | Barnsley | H04N 19/99 382/209 |
| 5,649,192 A | 7/1997 | Stucky | |
| 5,960,437 A | 9/1999 | Krawchuk et al. | |
| 9,077,823 B1 * | 7/2015 | Grosz | H04N 1/00196 |
| 2010/0100546 A1 * | 4/2010 | Kohler | G06F 16/40 707/739 |
| 2012/0207375 A1 * | 8/2012 | Contreras | G06T 7/90 382/133 |
| 2013/0073387 A1 * | 3/2013 | Heath | G06Q 30/02 705/14.53 |
| 2015/0347477 A1 | 12/2015 | Esmet et al. | |
| 2019/0079753 A1 * | 3/2019 | Makkar | G06F 8/36 |
| 2020/0160147 A1 * | 5/2020 | Bandyopadhyay | G06N 3/08 |
| 2021/0064574 A1 | 3/2021 | Gish | |

OTHER PUBLICATIONS

International Search Report and Written Opinion for International Application No. PCT/US2023/060481, dated May 4, 2023 (11 pages).

* cited by examiner

*Primary Examiner* — Angelica Ruiz (74) *Attorney, Agent, or Firm* — Goodwin Procter LLP (57) ABSTRACT

In a system for efficiently organizing, storing, and/or accessing project data, and for visualizing project progress, for a specified project, a fractal-based or bioinspired reference structure is selected. A file organization and storage structure is generated based on the reference structure. The reference structure includes tags that can indicate the appropriate storage locations for different types of project-related data based on the nature of the data. To storage a file, the name and/or contents of the file are analyzed and matched with one or more tags, so that the file can be stored at the location identified by the best matching tag.

13 Claims, 6 Drawing Sheets

Content based filing

Step 9

| Key-tag Match up | | |
|---|---|---|
| Location | Statistical match | Key Match |
| Loc 1 | 75% | Confidence: Low |
| Loc 2 | 87% | Confidence: High |
| Loc 3 | 5% | No |
| 4 | 9% | No |

Item 1

| Key-tag Match up | | |
|---|---|---|
| Location | Statistical match | Key Match |
| Loc 1 | 75% | Confidence: Low |
| Loc 2 | 95% | Confidence: High |
| Loc 3 | 5% | No |
| 4 | 9% | No |

Item 2

Step 12.3   Confidence: High match found for Loc 2. File automatically.   Confidence: High match found for Loc 2. File automatically.

Step 12.3.1

Name: Data Spreadsheet 1

| Col1 | Col2 | Col3 |
|---|---|---|
| A | B | C |
| A | B | C |
| A | B | C |
| A | B | C |
| A | B | C |
| A | B | C |
| A | B | C |
| A | B | C |
| A | B | C |

Name: Data Spreadsheet 1

| Col1 | Col2 | Col3 | Col4 | Col5 |
|---|---|---|---|---|
| A | B | C | D | E |
| A | B | C | D | E |
| A | B | X | D | E |
| A | B | C | D | E |
| A | B | C | D | E |
| A | B | C | D | E |
| A | B | C | D | E |
| A | B | C | D | E |
| A | B | C | D | E |

Keys

Name: Data Spreadsheet 1

Col2  Col3  A
B  C  Col1

Keys

Name: Data Spreadsheet 1   Col1

Col2  Col3  A
B  C  D
E  Col4  Col5
X

Step 12.3.2

Item 1 Keys to Item 2 Keys Comparison: 100%
Item 1 to Item 2 Content Match: 95%
Result: Item 2 is a new version of Item 1
Action: File in same location, mark Item 2 with V2 and Item 1 with V1

FRACTAL GEOMETRY OR BIO-INSPIRED SYSTEM FOR COMPLEX FILE ORGANIZATION AND STORAGE

CROSS-REFERENCE TO RELATED APPLICATIONS

This application claims priority to and benefit of U.S. Provisional Patent Application No. 63/298,401, titled "A Fractal Geometry or Bio-inspired System for Complex File Organization and Storage," filed on Jan. 11, 2022, the entire contents of which are incorporated herein by reference.

FIELD

This disclosure generally relates to storage systems and, in particular, to efficient file management and storage systems.

BACKGROUND

File management and storage systems have been known for decades. They started out as systems for storage on magnetic tapes, and were then adapted for hard-disc storage. Subsequent improvements were directed to improving reliability and performance of storage, e.g., using distributed, multi-disc, hierarchical storage. More recently, the use of cloud-based storage and distributed storage are becoming prevalent. Some storage systems also include versioning systems that allow users to keep track of and compare different versions of a document.

A common aspect of these systems is that they are generally user driven. The user determines a filename, the user determines a folder in which the file is to be stored, and the user determines whether a new version is to be created. There are some exceptions. For example, the pictures downloaded from a camera may be downloaded automatically to a folder such as "My Pictures" and the filename for each picture may be generated automatically. Such techniques typically use pre-configured folders and filenames. Also, the filenames and storage location are determined by a specific application, such as the camera software.

SUMMARY

A new type of file organization and storage structure is provided, which corresponds to a particular project under consideration. The file organization and storage structure and the project both correspond to a reference structure that can be a fractal-based structure or a bioinspired structure. The files (digital objects in general) that are associated with the project are stored at a storage unit configured according to the file organization and storage structure.

Accordingly, in one aspect, a method is provided for efficiently analyzing, renaming, organizing, and/or storing files. The method includes: receiving a digital object, where the digital object comprises a file or a folder, and identifying one or more keys based on the name or the content of the digital object. The method also includes matching, based on a similarity metric, at least one of the one or more keys with one or more tags. The tags are associated with a reference structure or with respective stored items stored in a file organization and storage structure corresponding to the reference structure. The reference structure includes a fractal geometry or a bioinspired based structure, and each tag corresponds to a respective file or folder having a file path or folder path associated with a storage unit and according to the file organization and storage structure corresponding to the reference structure. The method also includes selecting one or the one or more tags, and identifying as a candidate location of the digital object, the file or folder corresponding to the selected tag.

Identifying the one or more keys may include natural language processing, image recognition, or image classification. One or more keys may include a word, a phrase, an image, or an audio segment. In some embodiments, a reference filename is associated with the matching key, and the method may include modifying the name of the digital object based on the reference filename. The received digital object may be stored as the file or folder corresponding to the selected tag. The storing may include storing a new version of the digital object as the file or folder. In some embodiments, the method may include, prior to the step of identifying one or more keys, translating the name or the content of the digital object using word-by-word translation or context-based translation.

In another aspect, a system corresponding to the method described above is provided. One technical advantage of the above-described storage mechanism is that the file organization can represent, at least in part, the project progress. Therefore, a depiction of the file organization and storage structure can indicate project progress and/or status, avoiding the need for another mechanism that may otherwise be needed to indicate project progress and/or status. This can minimize or even avoid the need for the computations that would otherwise be needed to understand the project progress and/or status.

Another technical advantage is that the storage of the digital objects associated with a project is agnostic to the styles, preferences, and practices of the individuals associated with the project. Instead, the data are organized and stored in a project-centric manner, which can minimize the time required for accessing the data, especially in situations where one individual may store the data and another individual may need to access it. Moreover, duplication of data can be minimized, if not avoided, which can minimize errors resulting from unknowingly accessing out-of-date data. The minimization/avoidance of duplicate data (e.g., files and folders) can also minimize the storage requirements and processing cycles required for identifying and accessing the most up-to-date data. Certain digital objects transcend language because they are universally recognizable fractal or bio-inspired objects.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

DETAILED DESCRIPTION

Certain activities such as developing and building a wind energy project, building a solar photovoltaic project, doing due diligence for investments, or carrying out legal discovery for a legal case typically involve hundreds if not thousands of documents. These documents usually span a range of categories, such as project engineering specifications/requirements, health and safety assessments, materials sourcing, environmental and social impact studies, local, state, and/or federal approval, funding-related documents, documents relating to procurement and delivery of materials, labor-related documents, etc. Documents may also be interconnected where by one document depends on the content of another document and the categories covered by these documents be interlinked (e.g., a contract that makes no mention of project milestones but may make reference to an annex in a separate document that may specify certain project milestones- thus the contract is inherently linked to the project milestones specified in the annex).

Some of these documents may change during the course of the project, and such changes can cause a ripple effect across the data repository, due to the aforementioned potential for document interlinkage. For example, a change in the requirements for respecting species habitats can cause an environmental impact report to change. That modification can spawn a change in any linked engineering specifications/requirements documents. The disapproval of a construction permit can also cause a change in engineering specifications/requirements documents and/or a change in the documents specifying the materials to be used. This change can cause a change in environmental impact report, and so on.

A user-controlled document management and storage system can be inefficient and/or error prone under these circumstances. One of the reasons for these shortcomings is that typically different types/categories of documents are created and maintained by different groups of personnel. For example, architects and engineers may handle engineering specifications/requirements documents, financing personnel may manage product procurement documents, and regulation experts may manage government entity permits. The ripple effects, such as those described above, may require co-ordination between different groups of personnel in determining whether a document has changed or should be changed, where the new or modified document(s) should be stored, and how should they be linked.

The lack of co-ordination or a coherent strategy can lead to an inefficient use or waste of computing resources. For example, some files/documents may be stored as duplicates, which may waste storage space. This can also waste computing resources, such as processor time, battery life, etc., in searching for all the different versions of a particular file/document, and determining which of those documents is the most up-to-date and/or valid. Such problems can occur in relatively medium or small projects, such as building a local solar energy farm, a subdivision, a highway underpass, etc., and they can be pronounced e.g., exponentially, in relatively large projects.

Examples of errors that may occur in a conventional user-controlled file management and storage system include failure to store a document, or a misplaced document, such that the document may become inaccessible to those who may need it. Another example includes creating multiple versions of a single document in different folders, where such versions may eventually become out-of-synch, and the users may not be notified of up issuance or know which version is the most up-to-date one.

Since the documents are generally related to the progress of a project, errors in document storage and retrieval can mask the true status of a project, and can lead to a waste of resources. For example, if a particular permit is denied the project cannot proceed. If those in charge of taking corrective actions cannot access, or are not aware of that denial notice, taking corrective actions would be delayed further, until the document is found or is reobtained. In the meantime, parts or materials that need to be changed, in order to address the denial of the permit, may nevertheless be obtained, resulting in a waste of time and effort.

Various embodiments described below can improve the efficiency of document management and storage systems, and can minimize waste of storage and/or computational resources and/or errors such as those described above. This is achieved in part by performing file management and storage in not a user-controlled, but document centric manner. Specifically, the names and/or contents of the documents are programmatically analyzed to determine the correct location of the document in a file system. The location determination may be based on certain cues (also called tags) that a predefined file-system structure itself may provide. Such tags can be used to locate the relevant documents, so that any user, regardless of the nature of his/her task, may access the document. The access can be controlled (e.g., read only or full edit) and/or granted or denied based on user credentials. In general, this can minimize the likelihood of not finding a document that is needed. Moreover, if a document is not found, the user can be certain, generally, that the document is not misplaced and is indeed not yet available.

The file-system structure can be a fractal-based structure or a bio-inspired structure. Such a structure can provide a visualization of the progress of the project based on the status of documents. For example, an approved permit indicates that a particular aspect of the project is ready to proceed. Delayed shipment of parts, as indicated by a missing (not misplaced) delivery confirmation can indicate a stalled portion of the project.

Figure 1:
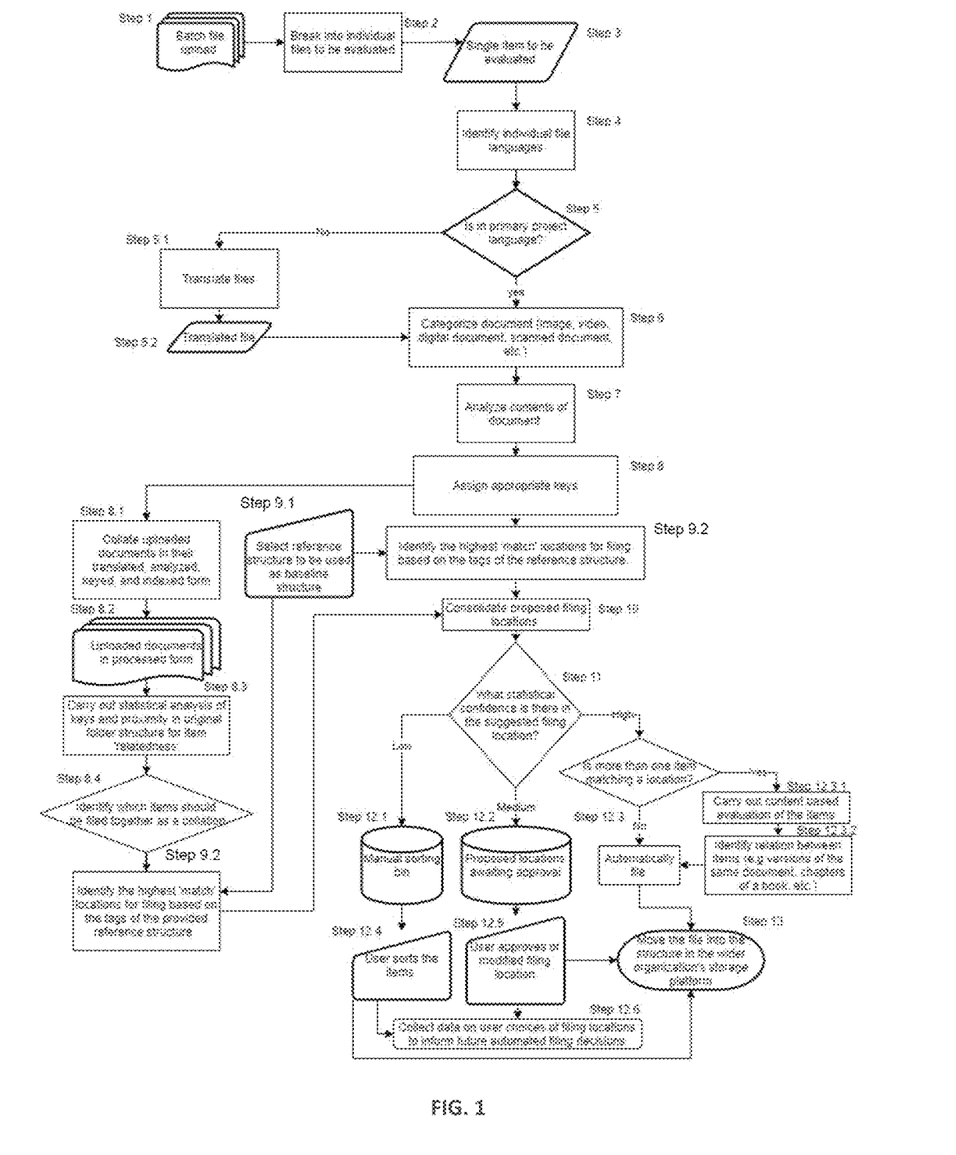
FIG. 1 is a flow chart depicting an overall process of storing digital objects according to various embodiments.

FIG. 1 shows the steps of determining the location at which a document may be stored. At step 1, a digitized or digital object is uploaded to the system. The object can be a single document (e.g., a file) or a folder containing multiple digital objects, including subfolders. At Step 2, batch uploads may be broken up into the individual files that make up the batch. A file to be analyzed is selected from the set of individual files in the batch upload, at Step 3. The file's language may be identified at Step 4. At Step 5, the file's language may be evaluated against the project's primary language, to identify if it is the same as the file's language. If the file is not in the project's primary language then the file may be translated into the primary language, at Step 5.1. At Step 5.2, the translated file is available to be used as the file to be analyzed, as discussed below.

In step 6, the file is categorized so that an appropriate analyzer for analyzing the file contents may be selected. For example, a file may be categorized as an image file, a video file, a digital document, a scanned document, etc., or as a mixed content file, where more than one analyzers may be used to analyze different portions of the file. In step 7, the processing system analyzes the content in a file using the appropriate analyzer identified in Step 6. In some embodiments, the system identifies key words, frequently occurring words, frequently occurring phrases, contents of images, characteristic sounds in audio files, and/or the contents of videos. Such identified portions of the file content may be representative of the overall contents of the respective files. In step 8, the file is indexed, where relevant keys corresponding respectively to the identified portion(s) of the file content, and keys corresponding, respectively, to the file type, name, and/or structure, are assigned to the file.

Steps 8.1 through 8.4 are relevant in the case of a batch upload of several digital objects (files). In step 8.1, the file IDs and the relevant keys generated based on the file analysis of all the files in the batch upload are assembled. The original structure of the batch upload of the processed documents is held in memory in step 8.2. In step 8.3, a statistical analysis of the batched documents, including their respective positions in the batch upload structure, is performed to evaluate the degree to which different files may be related. Step 8.4 identifies which files are related substantially so as to be considered a contiguous digital item (file), and collate those files together.

The determination of whether two files are related is based on their relative closeness as informed by either or a combination of two metrics. First metric is their proximity in the uploaded folder structure (e.g., two files are uploaded together as the whole folder containing them is uploaded). The second is the similarity in the content of the files (key words, titles, style, type of document, type of stamps, etc.). For instance, consider the upload of a folder containing the separate chapters of a book. All the documents have a close proximity as they have been uploaded as part of a existing folder. Their relationship could be further confirmed by comparing contents, for example they may have similar keys in the form of character names, titles, author names, writing style etc. Additional details of the relationship, for example the order in which the files make up the contiguous digital item may be determined from keys in the form of chapter names, page numbers, the names of the file and/or the contents of the file.

In step 9.1, a fractal-based or a bioinspired reference structure is selected. A location in the selected reference structure that is most relevant to the key(s) of the contiguous item, or to the key(s) of the analyzed file, if only a single digital item is uploaded, is identified in step 9.2. To this end, the system can search for and identify one or more filing locations on the filing system by comparing the combination of the file's (or the contiguous digital item's) identified keys and name and the tags corresponding to the several locations in the reference structure. The tags generally represent the nature of the information. For example, a tag may indicate that a corresponding file is a permit, a site photograph, a site survey, an identification document, etc. The reference structure may contain a pre-determined set of information and rules based on fractal geometry, which specify the allowable object (file) name characteristics for a particular system location.

All the considered filing location and their respective statistical confidence scores, based on the above-described respective matches, are collected in step 10. In step 11, the respective confidence scores corresponding to the considered filing locations are classified. Specifically, the statistical confidence score of a considered filing location may be designated high, medium, or low based on user-defined thresholds. As one example, a score below 75% may be designated low, above 75% but below 95% may be designated medium, and above 95% may be designated high.

Based on the score classification, the digital object (e.g., a single file or a set of files corresponding to a contiguous digital item) may be stored in step 12. Step 12 includes several sub-steps discussed below. Not each of sub-steps 12.1 through 12.6 is executed in connection with the processing of a particular digital object. As discussed below, some of these steps are mutually exclusive. In step 12.1, if the statistical confidence of all of the considered locations is low, then the file may need to be filed manually, and is flagged accordingly. In step 12.2, if the maximum statistical confidence of a considered location is medium, the user may be provided with suggested locations to file, and the system may await user approval before filing the digital object at that location. The suggested location is associated with the confidence score designated medium.

In step 12.3 if the statistical confidence score of only one considered location is high, then the digital object (e.g., a single file or a set of files corresponding to a contiguous digital item) may be filed (stored) automatically at the filing location associated with the high score. If more than one confidence scores are high, the digital object may be stored at the location associated with the highest high score. Alternatively, the user may be presented all the different locations associated with the different high confidence scores, and the file may then be stored at a location selected by the user from the suggested locations.

In step 12.3.1, if there are already one or more files at the selected location, a comparison between the new file to be stored and the file(s) already stored at the selected location may be performed. Based on the comparison, in step 12.3.2, a relationship between the new file to be stored and the file(s) already stored at the selected location may be identified. For example, the different files may correspond to different versions, or to different chapters of the same book, or may be different views, or time series of a scene, or edits of an image, etc. Based on the relationship, a new version of the file may be created, or a status value associated with the file may be changed. For example, the status of a permit may be changed from pending to granted.

In step 12.4, as a result of step 12.1, the user may manually file the digital object at an appropriate user-specified location. In step 12.5, as a result of step 12.2 the user may approve the suggested location, or may select a new filing location. Data from the user choices is collected in steps 12.4 and 12.5 to help inform better suggested locations in subsequent storage of digital objects. In step 13, the file(s) associated with the uploaded digital object(s) are stored at the general data storage platform used for the project/organization at the selected location. The data storage platform may include one or more storage units, such as RAM, solid-state drives, disc, multi-discs, etc. A particular storage unit can be a single storage unit or can be a collection of distributed storage units. A storage platform or a storage unit can also include a cloud-based storage system and/or distributed storage.

Figure 2:
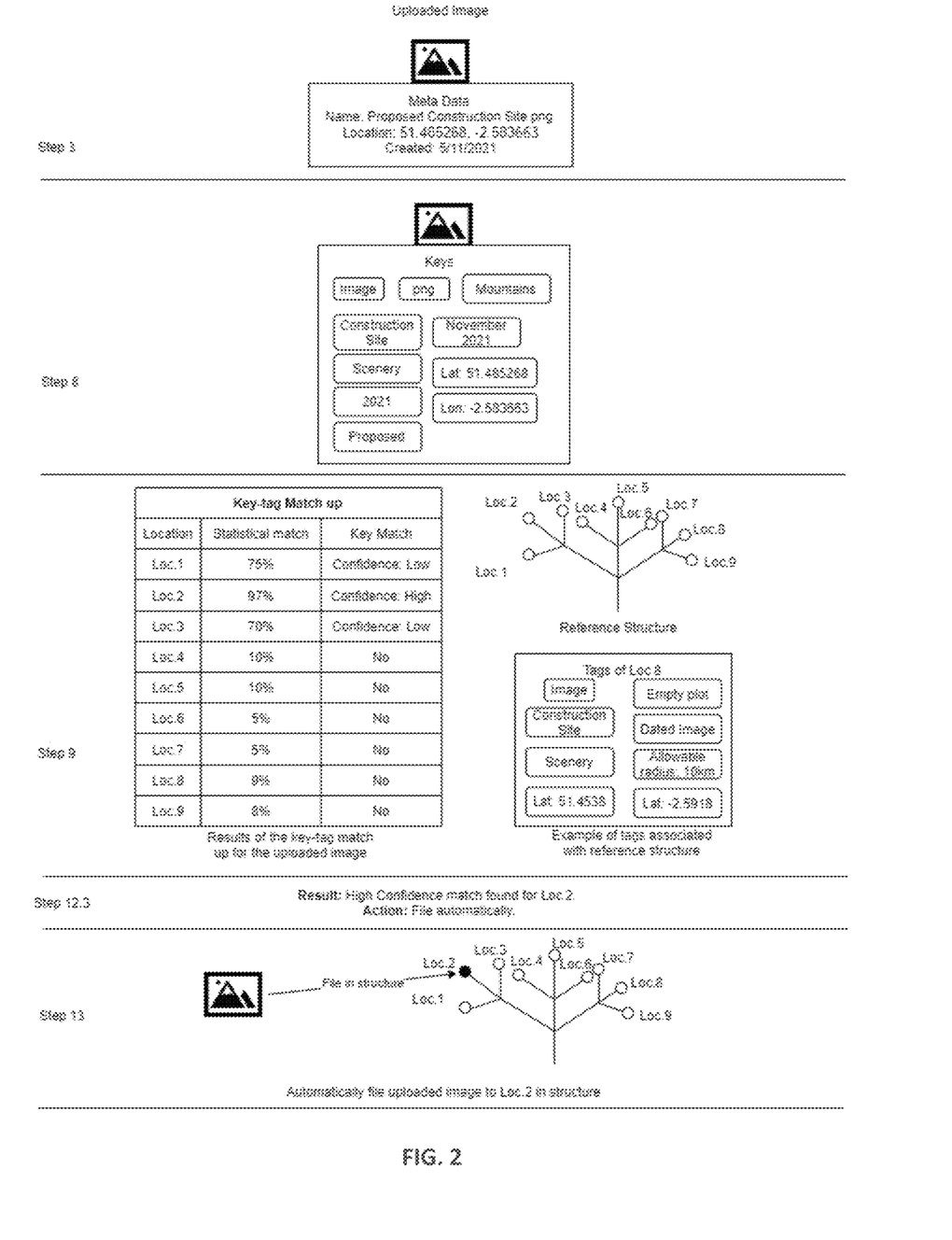
FIG. 2 illustrates the details of certain steps depicted in FIG. 1.

In FIG. 2, steps 3 and 8 correspond, respectively, to steps 3 and 8 of FIG. 1. Steps 3 and 8 of FIG. 2 show examples of metadata that can be retrieved from an existing name of a document (a digital object, in general), and/or its contents. Such metadata may be referred to as keys. Once the correct location for the storage of this document is determined, the document name can be changed, e.g., to conform to the file system's naming convention.

Step 9 of FIG. 2 corresponds to Step 9 of FIG. 1, and shows different kinds of tags that may be obtained from the file structure to be used. Tags may also be generated/obtained from the digital objects that are already stored in a file system corresponding to the file structure. The file structure can be fractal based or can be bioinspired.

Examples of fractal-based structures include, though are not limited to, the Mandelbrot set-based structures, Lindenmayer systems (also called L systems), and Iterated function systems. Examples of bioinspired systems include (though are not limited to), tree inspired file structures, coral reef inspired file structures, cacti inspired file structures, slime-mold (e.g., *Physarum polycephalum*) inspired file structures.

Step 12.3 of FIG. 2 corresponds to step 12.3 (which include steps 12.3.1 and 12.3.2) of FIG. 1, and shows a matching (according to a specified criteria) between a key from a digital object to be stored and a tag obtained based on a reference structure. The matching may be based on a statistical distance, or a statistical correlation. An exact match can occur but is not needed. A similarity metric for the match, e.g., the distance/difference can be greater than 0%, such as 1%, 5%, 30% etc. The metric may be based on several different characteristics of the tags/keys and the distance may be a composite distance obtained by aggregating distances associated with the individual characteristics. The characteristics of a tag or key can include file name, file type, file-name extension, file size, file date, subject matter of the content, author of the content, etc. The author can be an individual, an entity or a group/department within an entity.

The similarity metric may also be based on a correlation, and like the distance, the correlation can be less than 100%, e.g., 90%, 70%, 50%, 20%, etc. In determining a match, the distance/correlation may be associated with a confidence level, and the match may be determined, in part, based on the confidence level. For example, a relatively low correlation but with a relatively high confidence level may indicate a match, and a relatively high correlation but with a relatively low confidence level may not indicate a match. Step 13 of FIG. 2 corresponds to Step 13 of FIG. 1, and shows the loading/storage of a file (a digital object, in general) to a location associated with a matched tag.

Figure 3:
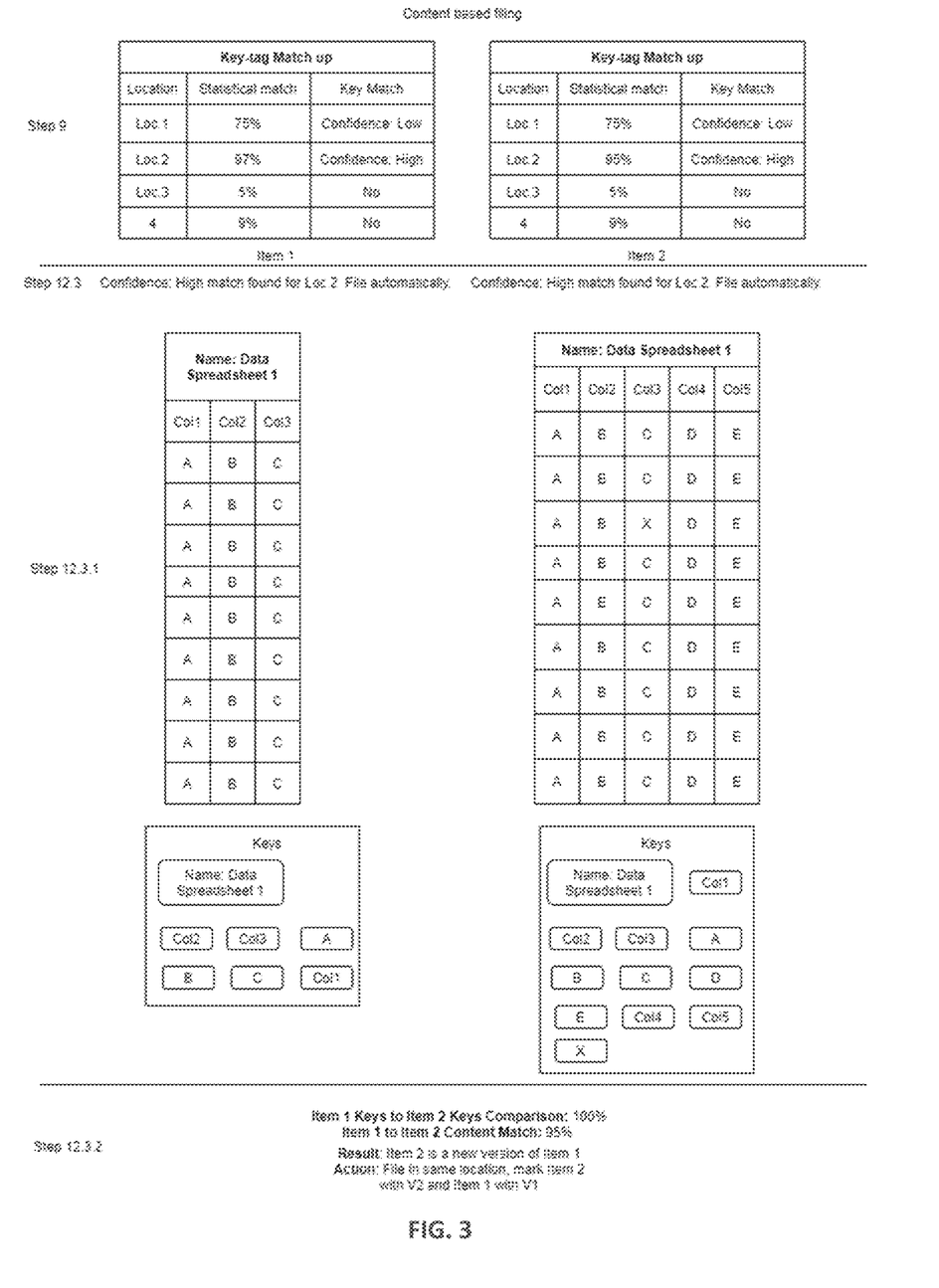
FIG. 3 also illustrates the details of certain steps depicted in FIG. 1.

In FIG. 3, steps 9, 12.3.1, and 12.3.2 correspond, respectively, to steps 9, 12.3.1, and 12.3.2 of FIG. 1. These steps are similar to the corresponding steps shown in FIG. 2. In FIG. 2, the matching is shown based on tags found in the reference file structure. In FIG. 3, the matching is shown based on the contents of digital objects that are already stored in a file system that is based on the reference file structure. In other words, with reference to FIG. 3, the tag is generated/obtained not from the reference structure, but from the file(s) or the keys of the files already stored in a file system, where the storage was based on the selected reference structure.

In general, the tags are predetermined features of the reference structure or the keys of files that have been added to a file system based on the reference structure. This way the reference structure can grow and gets smarter as more files get added to the corresponding file system. This is illustrated with the following example: (1) File A is uploaded; (2) File A keys are extracted; (3) File A keys are matched against the tags in a selected reference structure; (4) File A's filing location is identified by a key-tag matchup; (5) File A is filed at the identified location; (6) File A's keys are added to the reference structure's tags. A tag is a generalized item while a key is related to the content of a file (a digital object, in general) and is more specific. For example the tags associated with a storage location may be [picture, animal] and the keys of a file that may be stored at that location can be [.png, dog]. Where the key ".png" is a type of image so the key matches the tag, and the key "dog" is a type of animal and thus also matches the tag.

In FIG. 3, steps 12.3.1 and 12.3.2 also demonstrates versioning and document update. In particular, the newly obtained document that is to be stored is a spreadsheet. The matching document, that was previously stored, is also a spreadsheet. But, while the previously stored spreadsheet had only three columns, the new spreadsheet has two additional columns. As such, the new spreadsheet may be associated with additional keys (e.g., Col4, Col5) compared to the keys that are associated with the existing spreadsheet. Upon updating the document (the new spreadsheet) at the selected location, the tags in the reference structure may be updated, e.g., to modify the number of columns from 3 to 5, and/or to include the subject/header of the new columns.

Figure 4:
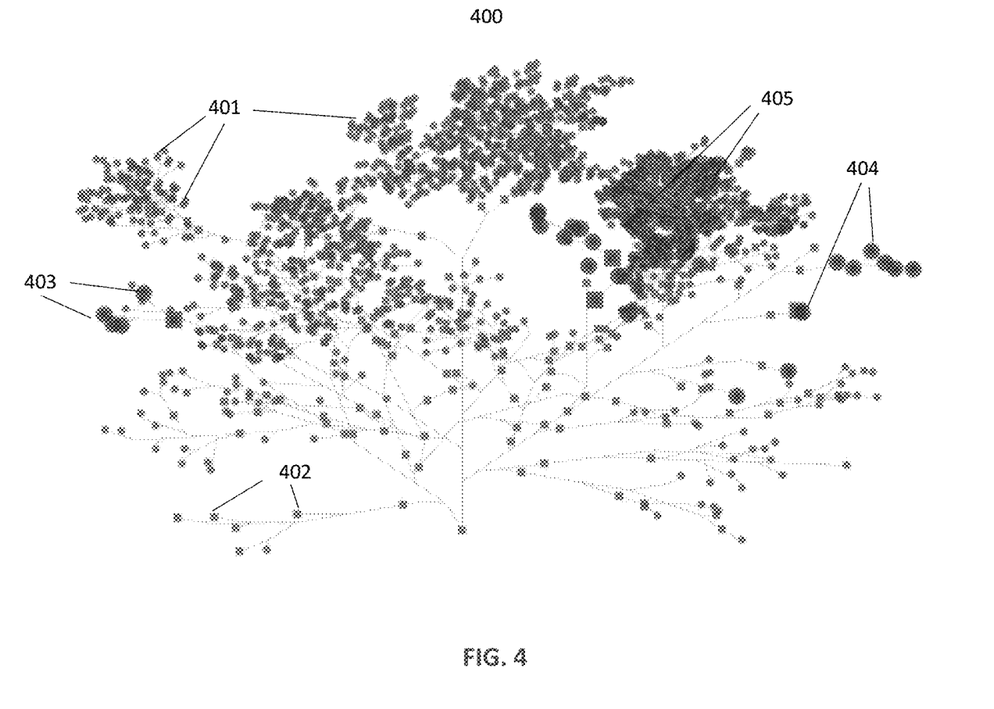
FIGS. 4-6 are depictions of different files systems according to various embodiments.

FIG. 4 is a depiction of a file system 400 based on a tree-type structure, e.g., a bioinspired reference structure. The various leaf nodes 401 are typically the stored files, and various non-leaf nodes 402 are typically folders and sub-folders. The nodes can have different shapes, sizes, shading or marking patterns, and/or colors, indicating different aspects, e.g., the tasks and sub-tasks of a project and the progress and/or status of those tasks and sub-tasks. For example, the existence or contents of certain files as indicated by nodes 401 may indicate that the associated tasks have been completed, while the contents of certain files as indicated by nodes 403 may indicate that the associated tasks are incomplete, behind schedule, and/or stalled. The incomplete, behind schedule, and/or stalled tasks may also be indicated by the lack of files at locations 404, where such files are expected to be stored according to the reference structure. The contents of files 405 may indicate that the corresponding tasks have not been completed, but are on track. Thus, a depiction of a file system that is based on a fractal-based or a bioinspired reference structure, and where the files are stored as discussed above, can indicate the progress and/or status of a project and/or its tasks and sub-tasks.

Figure 5:
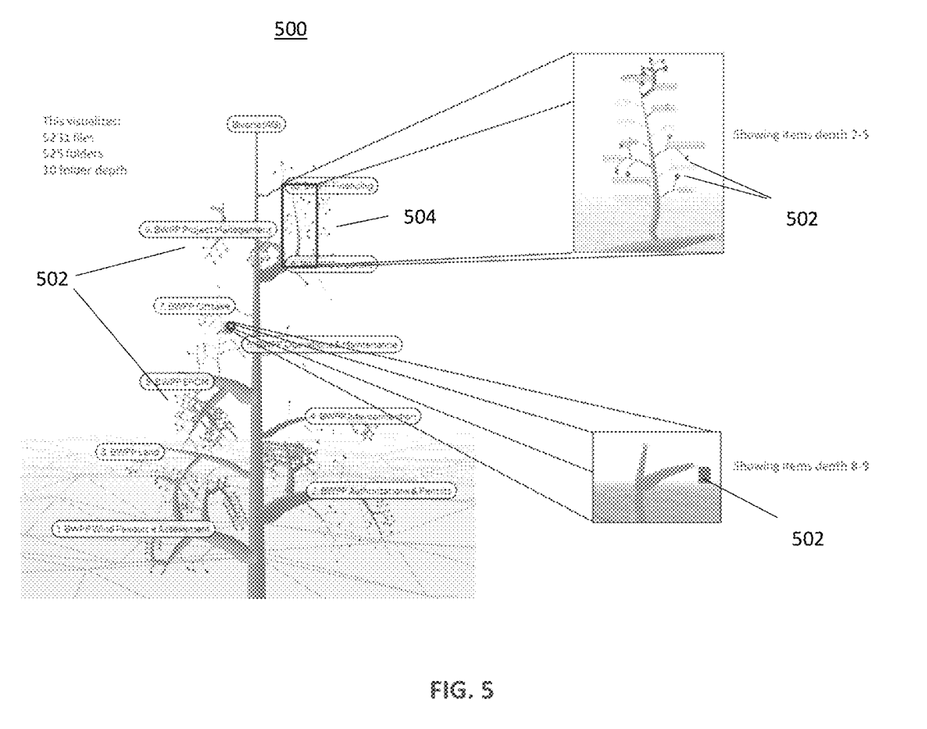

FIG. 5 is a depiction of a file system 500 based on another tree-type structure, e.g., a bioinspired reference structure, which is also a fractal-based structure. Here again, the leaf nodes 502 indicate files stored in the file system. Item 504 is a sub-folder structure that has a similar structure as that of the overall reference structure.

Figure 6:
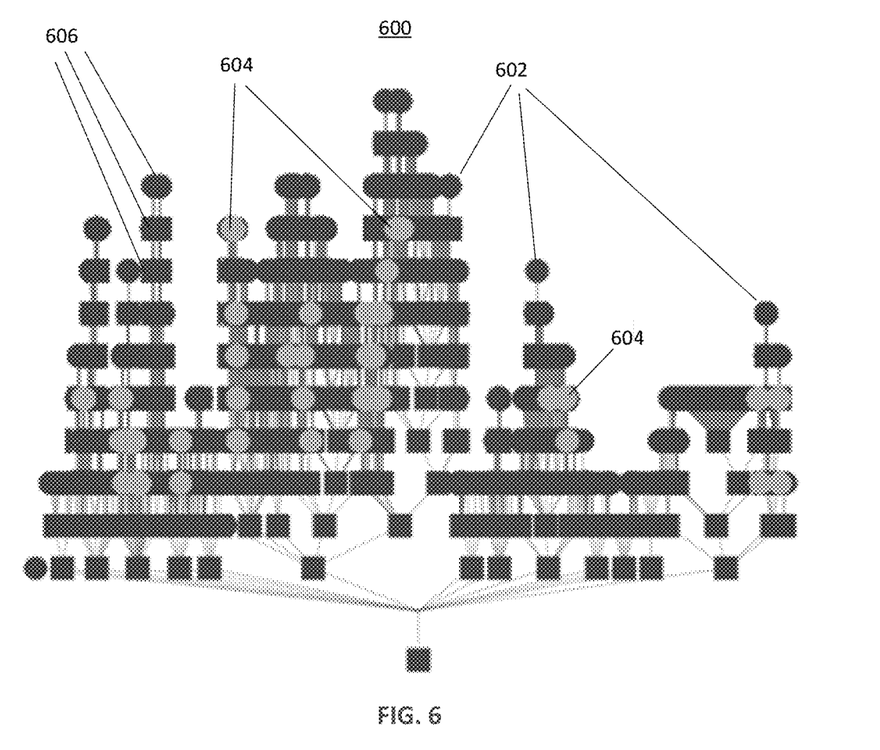

FIG. 6 is a depiction of a file system 600 based on another fractal-based structure. In this file system, nodes 602, which may represent folders, sub-folders, and/or files, match those in the corresponding reference structure. In other words, the folders, sub-folders, and/or files represented by nodes 602 are expected by the selected reference structure. Nodes 604 represent folders, sub-folders, and/or files that are present or added to the file system 600, but are not expected by the corresponding reference structure. Nodes 606 represent folders, sub-folders, and/or files that are not present or are deleted in the file system 600, even though they were expected by the corresponding reference structure. Thus, in this example, the depiction of the file system shows how the actual file system conforms to and/or differs from the selected reference structure. Here again, if any of the folders, sub-folders, and/or files represented by nodes 606 are essential to the project, the lack thereof can indicate that the corresponding tasks/sub-tasks of the project have not been completed. Thus, this depiction can also indicate the progress and/or status of the project.

A computing system used to implement various embodiments may include general-purpose computers, vector-based processors, graphics processing units (GPUs), network appliances, mobile devices, or other electronic systems capable of receiving network data and performing computations. A computing system in general includes one or more processors, one or more memory modules, one or more storage devices, and one or more input/output devices that may be interconnected, for example, using a system bus. The processors are capable of processing instructions stored in a memory module and/or a storage device for execution thereof. The processor can be a single-threaded or a multi-threaded processor. The memory modules may include volatile and/or non-volatile memory units.

The storage device(s) are capable of providing mass storage for the computing system, and may include a non-transitory computer-readable medium, a hard disk device, an optical disk device, a solid-date drive, a flash drive, or some other large capacity storage devices. For example, the storage device may store long-term data (e.g., one or more data sets or databases, file system data, etc.). The storage device may be implemented in a distributed way over a network, such as a server farm or a set of widely distributed servers, or may be implemented in a single computing device.

The input/output device(s) facilitate input/output operations for the computing system and may include one or more of a network interface devices, e.g., an Ethernet card, a serial communication device, e.g., an RS-232 port, and/or a wireless interface device, e.g., an 802.11 card, a 3G, 4G, or 5G wireless modem. In some implementations, the input/output device may include driver devices configured to receive input data and send output data to other input/output devices, e.g., keyboard, printer and display devices. In some examples, mobile computing devices, mobile communication devices, and other devices may be used as computing devices.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Various embodiments and functional operations and processes described herein may be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface (GUI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting. The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The invention claimed is:

1. A method for efficiently analyzing, renaming, organizing and storing files, the method comprising steps of:
   receiving a digital object, the digital object comprising a file or a folder;
   identifying one or more keys based on name or content of the digital object, wherein the one or more keys correspond to identified portions of the name or content;
   matching, based on a similarity metric, at least one of the one or more keys with one or more tags associated with: (i) a reference structure, or (ii) a stored item in a file organization and storage structure corresponding to the reference structure, wherein:
   the reference structure comprises a fractal geometry or a bioinspired based structure;
   each of the one or more tags corresponds to a respective file or folder having a file path or folder path associated with a storage unit and corresponding to the file organization and storage structure; and
   selecting a tag from the one or more tags;
   identifying as a candidate location of the digital object, the file or the folder corresponding to the selected tag; and
   storing the digital object in the candidate location.

2. The method of claim 1, wherein identifying the one or more keys comprises natural language processing, image recognition, or image classification.

3. The method of claim 1, wherein one or more keys comprise a word, a phrase, an image, or an audio segment.

4. The method of claim 1, wherein a reference filename is associated with the matching key, the method further comprising:
   modifying the name of the digital object based on the reference filename.

5. The method of claim 1 wherein the storing comprises storing a new version of the digital object as the file or folder.

6. The method of claim 1, further comprising, prior to the step of identifying one or more keys:
   translating the name or the content of the digital object using word-by-word translation or context-based translation.

7. A system for efficiently organizing, storing, accessing, and analyzing project data, the system comprising:
   a processor;
   a storage unit in electronic communication with the processor; and
   a memory in communication with the processor and comprising instructions which, when executed by the processor, program the processor to:
   receive a digital object, the digital object comprising a file or a folder;
   identify one or more keys based on name or content of the digital object;
   match, based on a similarity metric, at least one of the one or more keys with one or more tags associated with: (i) a reference structure, or (ii) a stored item in a file organization and storage structure corresponding to the reference structure, wherein:
   the reference structure comprises a fractal geometry or a bioinspired based structure;
   each of the one or more tags corresponds to a respective file or folder having a file path or a folder path in the storage unit and according to the file organization and storage structure;
   select a tag from the one or more tags and identify as a candidate location of the digital object, the file or the folder corresponding to the selected tag; and
   store the digital object in the candidate location.

8. The system of claim 7, wherein to identify the one or more keys the instructions program the processing unit to perform natural language processing, image recognition, or image classification.

9. The system of claim 7, wherein one or more keys comprise a word, a phrase, an image, or an audio segment.

10. The system of claim 7, wherein:
    a reference filename is associated with the matching key; and
    the instructions program the processing unit to modify the name of the digital object based on the reference filename.

11. The system of claim 7, wherein the instructions further program the processing unit to:
    store the received digital object as the file or folder corresponding to the matching tag.

12. The system of claim 11, wherein to store the received object, the instructions program the processing unit to store a new version of the digital object as the file or folder.

13. The system of claim 7, wherein the instruction further program the processing unit to:
    translate the name or the content of the digital object using word-by-word translation or context-based translation.

* * * * *